United States Patent
Oh et al.

(10) Patent No.: US 10,437,125 B2
(45) Date of Patent: Oct. 8, 2019

(54) DISPLAY DEVICE

(71) Applicant: Samsung Display Co., Ltd., Yongin-si, Gyeonggi-do (KR)

(72) Inventors: Se Joon Oh, Suwon-si (KR); Se Jin Kim, Cheonan-si (KR); Young Uook Lee, Busan (KR); Jung Su Lee, Seoul (KR); Sang Yeoul Lim, Suwon-si (KR); So Mi Jung, Busan (KR); Young Min Jung, Gwangmyeong-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/816,056

(22) Filed: Nov. 17, 2017

(65) Prior Publication Data

US 2018/0341137 A1 Nov. 29, 2018

(30) Foreign Application Priority Data

May 24, 2017 (KR) .................. 10-2017-0064166

(51) Int. Cl.
*G02F 1/1368* (2006.01)
*G02F 1/1362* (2006.01)
*G02F 1/1337* (2006.01)

(52) U.S. Cl.
CPC ...... *G02F 1/1368* (2013.01); *G02F 1/136227* (2013.01); *G02F 1/1337* (2013.01); *G02F 2001/136222* (2013.01); *G02F 2201/123* (2013.01); *G02F 2201/50* (2013.01); *G02F 2201/501* (2013.01)

(58) Field of Classification Search
CPC ............. G02F 1/1368; G02F 1/136286; G02F 1/136227; G02F 1/1337; G02F 2001/136222; G02F 2201/123; G02F 2201/50; G02F 2201/501
USPC .......................................................... 349/46
See application file for complete search history.

(56) References Cited

U.S. PATENT DOCUMENTS

| | | | |
|---|---|---|---|
| 2009/0121232 A1* | 5/2009 | Huh | G02F 1/136227 257/72 |
| 2015/0162377 A1* | 6/2015 | Lee | H01L 29/786 257/72 |
| 2015/0200211 A1* | 7/2015 | Hong | H01L 27/1248 349/43 |
| 2016/0259190 A1 | 9/2016 | Yan et al. | |

FOREIGN PATENT DOCUMENTS

JP 2012527636 11/2012

* cited by examiner

*Primary Examiner* — Edward J Glick
*Assistant Examiner* — William D Peterson
(74) *Attorney, Agent, or Firm* — Innovation Counsel LLP (57) ABSTRACT

The display device includes: a substrate; a thin-film transistor disposed on the substrate; a passivation layer covering the thin-film transistor; a capping layer disposed on the passivation layer; and a pixel electrode disposed on the capping layer and connected to the thin-film transistor, wherein a thickness of the capping layer is determined according to: $d1=(\lambda/2)\times(1/2n)$, where d1 denotes the thickness of the capping layer, $\lambda$ denotes a wavelength within visible wavelength range, and n denotes a ratio of refractive indices of the passivation layer to the capping layer.

23 Claims, 9 Drawing Sheets

DISPLAY DEVICE

This application claims priority to Korean Patent Application No. 10-2017-0064166 filed on May 24, 2017 in the Korean Intellectual Property Office, the disclosure of which is incorporated herein by reference in its entirety.

BACKGROUND

1. Field of the Disclosure

The present disclosure relates to a display device.

2. Description of the Related Art

Display devices display images and may be implemented as a liquid-crystal display (LCD) device, an organic light-emitting display (OLED) device, plasma display (PDP) device, an electrophoretic display (EPD) device, and electro-wetting display (EWD) device. Among these, LCD devices are widely used.

An LCD device includes two display panels on which field generating electrodes such as a pixel electrode and a common electrode are formed, and a liquid-crystal layer disposed therebetween. In addition, the LCD device includes a backlight unit disposed below the display panels to provide light.

Such an LCD device displays an image in such a manner that voltage is applied to field generating electrodes to generate electric field across a liquid-crystal layer, and the orientation of liquid-crystal molecules in the liquid-crystal layer are altered by the electric field applied to the field generating electrodes so as to control the amount of exiting light provided from the backlight unit.

Typically, a thin-film transistor is provided in one of two display panels of an LCD device. A thin-film transistor includes a gate electrode which is a part of gate wiring, a semiconductor layer which forms a channel, and a source electrode and a drain electrode which are part of data wiring. The thin-film transistor is a switching element for transmitting or interrupting an image signal transmitted to a pixel electrode via the data wiring, in response to a scan signal transmitted via the gate wiring.

SUMMARY

When light is irradiated onto a part of the semiconductor layer that protrudes from the line width of the source electrode and the drain electrode, bondings among the amorphous silicon molecules in the semiconductor layer are disconnected by the light energy, such that electron-hole pairs (e-h pairs) are formed.

Holes in such electron-hole pairs move toward the gate electrode by the voltage applied to the gate electrode, while electrons in the pairs move toward the drain electrode to cause a photo leakage current.

As a result, a current may flow even when the switching element is turned off, such that a display defect may occur in the display device.

Aspects of the present disclosure provide a display device capable of reducing leakage current caused by light incident on a switching element, thereby improving reliability of switching operation of the switching device and reducing display defects.

These and other aspects, embodiments and advantages of the present disclosure will become immediately apparent to those of ordinary skill in the art upon review of the Detailed Description and Claims to follow.

In accordance with one embodiment, a display device comprises: a substrate; a thin-film transistor disposed on the substrate; a passivation layer covering the thin-film transistor; a capping layer disposed on the passivation layer; and a pixel electrode disposed on the capping layer and connected to the thin-film transistor, wherein a thickness of the capping layer is determined according to: $d1=(\lambda/2)\times(1/2n)$, where $d1$ denotes the thickness of the capping layer, $\lambda$ denotes a wavelength within visible wavelength range, and n denotes a ratio of refractive indices of the passivation layer to the capping layer.

The $\lambda$ may be a wavelength within blue wavelength range.

A difference between the refractive index of the passivation layer and the refractive index of the capping layer may be equal to or greater than 0.2.

The passivation layer may be one of a red color filter, a green color filter and a blue color filter, and the capping layer may comprise an inorganic material.

The passivation layer may be the blue color filter, and wherein the capping layer comprises silicon nitride.

The thin-film transistor, the passivation layer and the capping layer may overlap with one another in a plan view.

The thin-film transistor may comprise a gate electrode, a semiconductor layer disposed on the gate electrode, a source electrode and a drain electrode disposed on the semiconductor layer, and the semiconductor layer may comprise a protrusion protruding from an end of the source electrode and an end of the drain electrode in a plan view.

The display device may further comprise: an alignment layer disposed on the pixel electrode; a liquid-crystal layer disposed on the alignment layer; and a backlight unit disposed below the substrate.

In accordance with another embodiment, a display device comprises: a substrate; a thin-film transistor disposed on the substrate; a passivation layer covering the thin-film transistor; a capping layer disposed on the passivation layer; and a pixel electrode disposed on the capping layer and connected to the thin-film transistor, wherein, for a wavelength within a wavelength range of light incident on the capping layer, a thickness of the capping layer is determined according to: $d1=(\lambda/2)\times(1/2n)$, where $d1$ denotes the thickness of the capping layer, $\lambda$ denotes a wavelength within the wavelength range of the light incident on the capping layer, and n denotes a ratio of refractive indices of the passivation layer to the capping layer.

The $\lambda$ may be a wavelength within blue wavelength range.

In accordance with still another embodiment, a display device comprises: a substrate; a thin-film transistor disposed on the substrate; a passivation layer covering the thin-film transistor; a first capping layer disposed on the passivation layer; a pixel electrode disposed on the first capping layer and connected to the thin-film transistor; and a second capping layer disposed on the same layer as the pixel electrode and overlapping with the thin-film transistor, wherein a sum of a thickness of the first capping layer and the second capping layer is determined according to: $d2=(\lambda/2)\times(1/2n)$, where $d2$ denotes the sum of the thickness of the first capping layer and the thickness of the second capping layer, $\lambda$ denotes a wavelength within visible wavelength range, and n denotes a ratio of refractive indices of the passivation layer to the first capping layer.

The $\lambda$ is a wavelength within blue wavelength range.

A difference between the refractive index of the passivation layer and the refractive index of the first capping layer may be equal to or greater than 0.2, and a difference between the refractive index of the first capping layer and the refractive index of the second capping layer may range from 0 to 0.2.

The passivation layer may be one of a red color filter, a green color filter and a blue color filter, wherein the first capping layer comprises an inorganic material, and the second capping layer may be made of the same material as the pixel electrode.

The passivation layer may be a blue color filter, wherein the first capping layer comprises silicon nitride, and the second capping layer may comprise indium tin oxide.

The thin-film transistor, the passivation layer, the first capping layer and the second capping layer may overlap with one another in a plan view.

The thin-film transistor may comprise a gate electrode, a semiconductor layer disposed on the gate electrode, a source electrode and a drain electrode disposed on the semiconductor layer, and the semiconductor layer may comprise a protrusion protruding from an end of the source electrode and an end of the drain electrode when viewed from a top.

A distance between an end of the second capping layer and an end of the protrusion may be determined according to: Pd≥tan 40°×2 t, where Pd denotes the distance between the end of the second capping layer and the end of the protrusion, and t denotes a maximum thickness of the passivation layer.

The second capping layer may completely cover the gate electrode.

The display device may further comprise: an alignment layer disposed on the pixel electrode; a liquid-crystal layer disposed on the alignment layer; and a backlight unit disposed below the substrate.

According to exemplary embodiments of the present disclosure, at least following effects can be achieved:

Leakage current caused by light incident on a switching element can be reduced, thereby improving reliability of switching operation of the switching device and reducing display defects.

It should be noted that effects of the present disclosure are not limited to those described above and other effects of the present disclosure will be apparent to those skilled in the art from the following descriptions.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Advantages and features of the present inventive concept and methods of accomplishing the same may be understood more readily by reference to the following detailed description of preferred embodiments and the accompanying drawings. The present inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the present inventive concept will only be defined by the appended claims.

It will also be understood that when a layer is referred to as being "on" another layer or substrate, it can be directly on the other layer or substrate, or intervening layers may also be present. The same reference numbers indicate the same components throughout the specification.

It will be understood that, although the terms first, second, third etc. may be used herein to describe various elements, components, regions, layers and/or sections, these elements, components, regions, layers and/or sections should not be limited by these terms.

These terms are only used to distinguish one element, component, region, layer or section from another element, component, region, layer or section. Thus, a first element, component, region, layer or section discussed below could be termed a second element, component, region, layer or section without departing from the teachings of the present inventive concept.

Hereinafter, exemplary embodiments of the present disclosure will be described with reference to the accompanying drawings.

Figure 1:
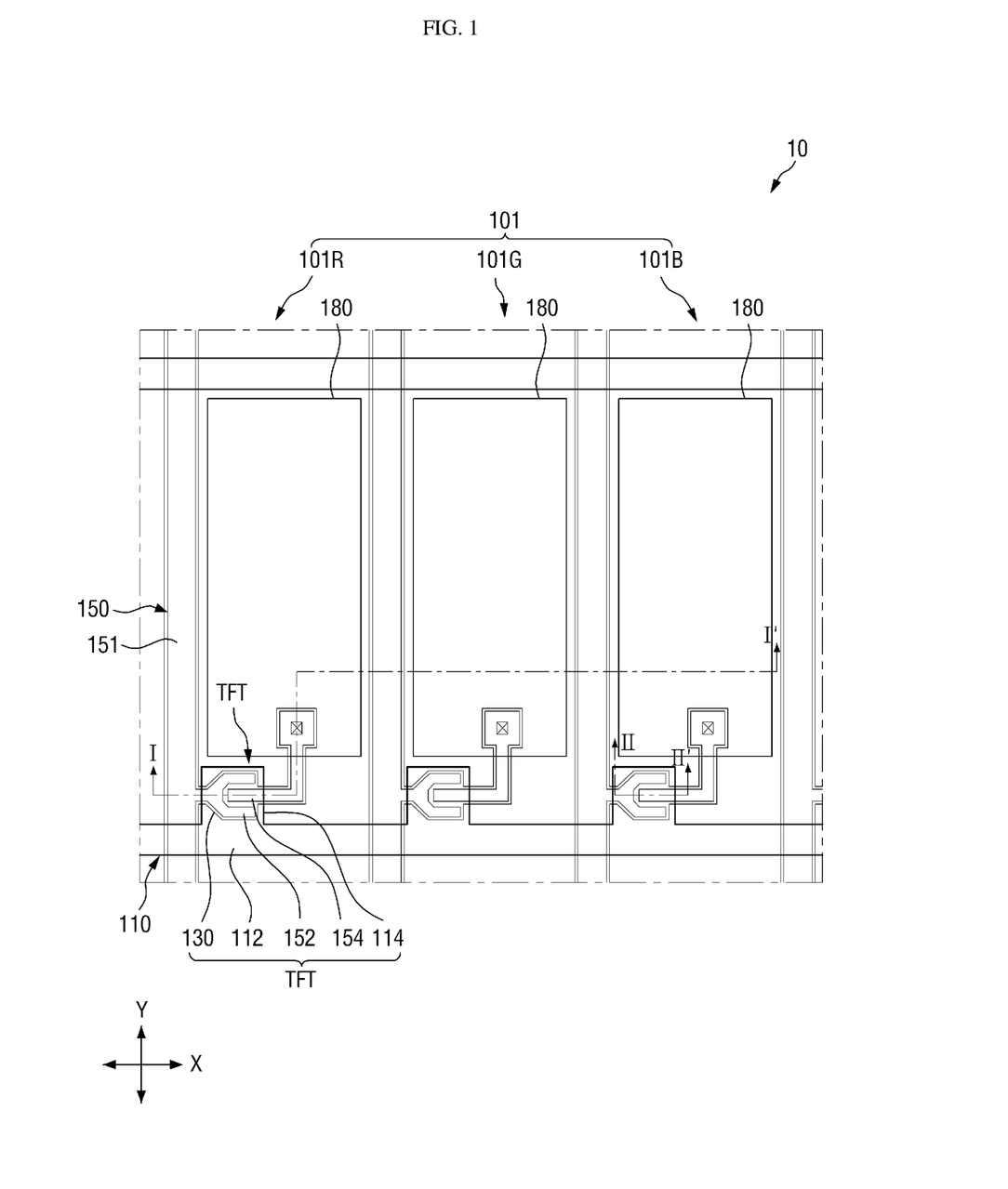
FIG. 1 is a schematic plan view of a display device according to an exemplary embodiment of the present disclosure.
Figure 2:
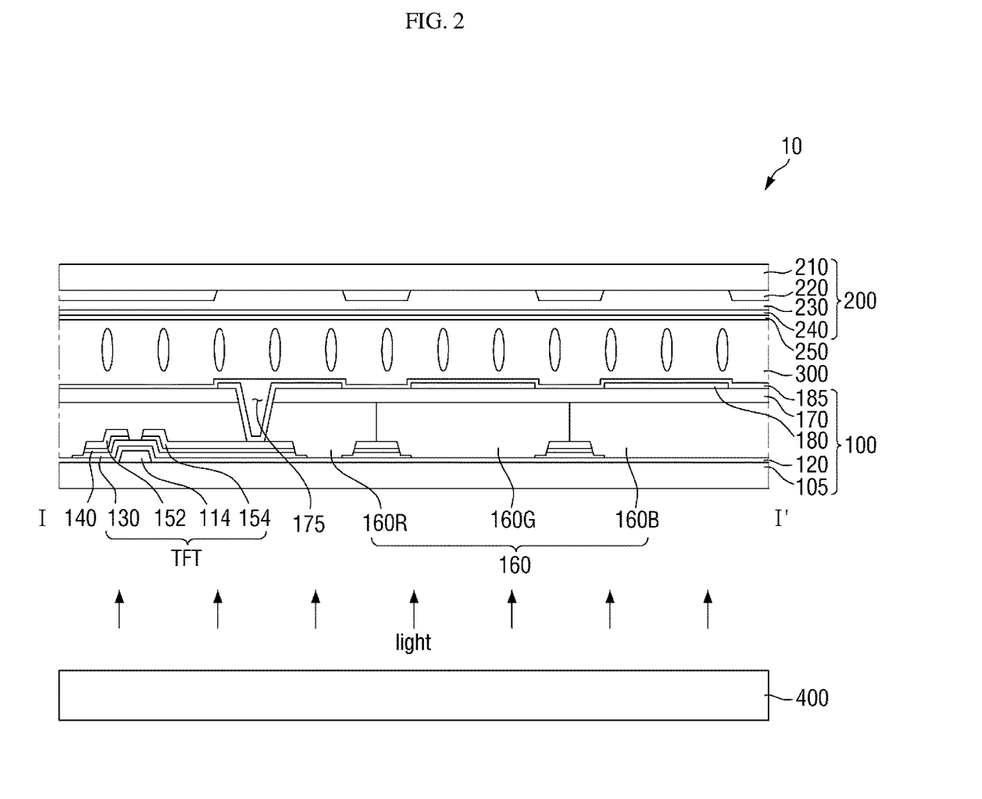
FIG. 2 is a cross-sectional view taken along line I-I' of FIG. 1.
Figure 3:
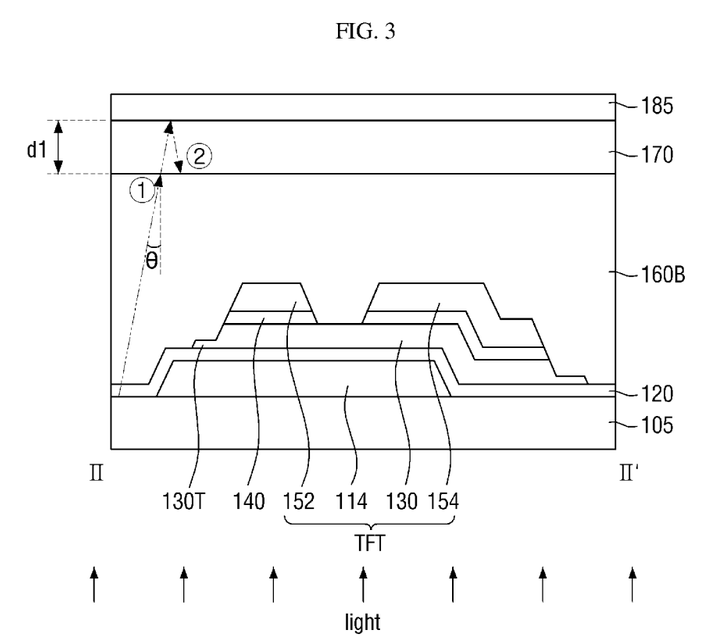
FIG. 3 is a cross-sectional view taken along line II-II' of FIG. 1.
Figure 4:
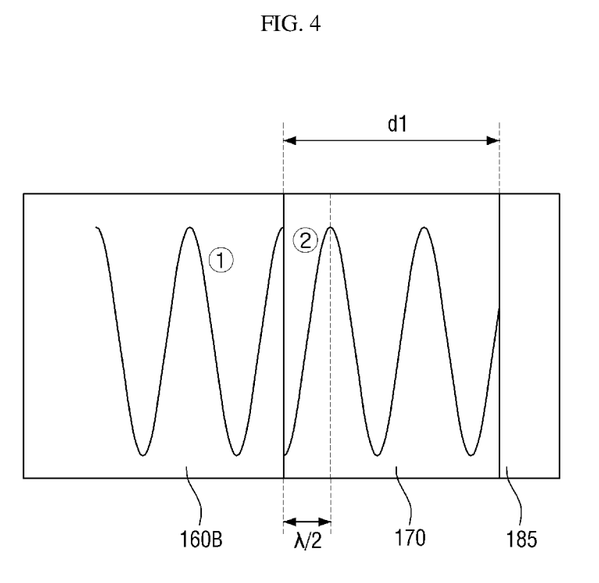
FIG. 4 is a view showing that the light incident on the passivation layer and the light reflected off the capping layer are cancelled at the interface between the passivation layer and the capping layer when the destructive interference condition is met.

FIG. 1 is a schematic plan view of a display device according to an exemplary embodiment of the present disclosure. FIG. 2 is a cross-sectional view taken along line I-I' of FIG. 1. FIG. 3 is a cross-sectional view taken along line II-II' of FIG. 1. FIG. 4 is a view showing that the light incident on the passivation layer and the light reflected off the capping layer are cancelled at the interface between the passivation layer and the capping layer when the destructive interference condition is met.

Referring to FIGS. 1 to 2, a display device 10 according to an exemplary embodiment of the present disclosure includes a first display panel 100, a second display panel 200 facing the first display panel 100, a liquid-crystal layer 300 disposed between the first display panel 100 and the second display panel 200, and a backlight unit 400 disposed below the first display panel 100.

The first display panel 100 includes a first substrate 105, a gate wiring 110, a gate insulating layer 120, a semiconductor layer 130, an ohmic contact layer 140, a data wiring 150, a passivation layer 160, a capping layer 170, a pixel electrode 180, and a first alignment layer 185.

The first substrate 105 may be made of transparent glass or plastic. The first substrate 105 includes a plurality of pixel regions 101. The plurality of pixel regions 101 may include a red pixel region 101R, a green pixel region 101G, and a blue pixel region 101B.

The gate wiring 110 is disposed on the first substrate 105 and transmits a gate signal. The gate wiring 110 includes a gate line 112 extending in a first direction X and a gate electrode 114 protruding from the gate line 112 in a direction different from the first direction X. The gate electrode 114 forms a thin-film transistor TFT together with the semiconductor layer 130, the source electrode 152 and the drain electrode 154 to be described later.

The gate wiring 110 may include: an aluminum-based metal such as aluminum (Al) and an aluminum alloy; a silver-based metal such as silver (Ag) and a silver alloy; a copper-based metal such as copper (Cu) and a copper alloy; a molybdenum-based metal such as molybdenum (Mo) and a molybdenum alloy; chrome (Cr); titanium (Ti); and tantalum (Ta).

In addition, the gate wiring 110 may have a multi-layer structure of conductive layers (not shown) having different physical properties. One of the conductive layers may be formed of a metal having a low resistivity metal such as an aluminum-based metal, a silver-based metal and a copper-based metal, so as to reduce signal delay or voltage drop of the gate wiring 110.

The other conductive layer may be formed of a material having excellent contact properties with other materials, particularly indium tin oxide (ITO) and indium zinc oxide (IZO), such as molybdenum-based metals, chromium, titanium and tantalum. Examples of combinations of the conductive layers may include a chromium lower layer and an aluminum upper layer, an aluminum lower layer and a molybdenum upper layer, and a titanium lower layer and a copper upper layer. It is to be noted that this is merely illustrative, and the gate wiring 110 may be formed of various metals and conductors.

The gate insulating layer 120 may be disposed on the first substrate 105 so as to cover the gate wiring 110. The gate insulating layer 120 may include silicon oxide (SiOx) or silicon nitride (SiNx). The gate insulating layer 120 may further include aluminum oxide, titanium oxide, tantalum oxide, or zirconium oxide.

The semiconductor layer 130 is disposed on the gate insulating layer 120 and forms a channel of the thin-film transistor TFT. The semiconductor layer 130 may overlap with at least the gate electrode 114, may have a line width larger than the line width of the data wiring 150 to be described below and may overlap with the data wiring 150. Accordingly, the end of the semiconductor layer 130 may be exposed beyond the end of the data wiring 150. The end of the semiconductor layer 130 may be referred to as a protrusion 130T (see FIG. 3).

The semiconductor layer 130 may be formed of amorphous silicon or oxide semiconductor including at least one elements of gallium (Ga), indium (In), tin (Sn) and zinc (Zn).

The ohmic contact layer 140 may be disposed on the semiconductor layer 130 to expose a portion of the semiconductor layer 130 overlapping with the gate electrode 114. The ohmic contact layer 140 serves to improve the contact characteristics between the source electrode 152 and the semiconductor layer 130 and between the drain electrode 154 and the semiconductor layer 130, which will be described later.

The ohmic contact layer 140 may be formed of amorphous silicon highly doped with an n-type impurity (n+ a-Si). The ohmic contact layer 140 may be eliminated if sufficient contact characteristics are obtained between the source electrode 152 and the semiconductor layer 130 and between the drain electrode 154 and the semiconductor layer 130.

The data wiring 150 may be disposed on the semiconductor layer 130. The data wiring may include the data line 151, the source electrode 152 and the drain electrode 154.

The data line 151 extends in a second direction Y intersecting the first direction X in which the gate line 112 extends. The source electrode 152 branches off from the data line 151 and extends onto the semiconductor layer 130 which overlaps with the gate electrode 114 in a plan view. The drain electrode 154 is spaced apart from the source electrode 152 and is disposed on the semiconductor layer 130 with the channel of the thin-film transistor TFT between the drain electrode 154 and the source electrode 152. The drain electrode 154 may extend on the semiconductor layer 130 such that it overlaps with the pixel electrode 180.

Since the semiconductor layer 130 has a line width larger than the line width of the data line 150 and overlaps with the data line 150 as described above, the protrusion 130T of the semiconductor layer 130 may be exposed beyond the ends of the source electrode 152 and the drain electrode 154.

The passivation layer 160 may be disposed on the thin-film transistor TFT, specifically, on the source electrode 152 and the drain electrode 154, and covers the thin-film transistor TFT. The passivation layer 160 may include an organic material and may include a red color filter 160R, a green color filter 160G, and a blue color filter 160B.

The red color filter 160R, the green color filter 160G and the blue color filter 160B may be disposed in the red pixel region 101R, the green pixel region 101G and the blue pixel region 101B, respectively. The red color filter 160R, the green color filter 160G and the blue color filter 160B impart red, green and blue colors, respectively, to the light provided from the backlight unit 400. Although not shown in the drawings, the red color filter 160R, the green color filter 160G and the blue color filter 160B may partially overlap with one another at the boundaries between the adjacent red pixel region 101R, green pixel region 101G and blue pixel region 101B or may be spaced apart from one another.

The capping layer 170 may be disposed on the passivation layer 160. The capping layer 170 may comprise an inorganic material, e.g., silicon nitride (SiNx). The capping layer 170 will be described in detail later.

In the passivation layer 160 and the capping layer 170, a contact hole 175 may be formed, via which a part of the drain electrode 154, e.g., the end of the drain electrode 154 may be exposed.

The pixel electrode 180 is disposed on the capping layer 170 in each of the red pixel region 101R, the green pixel region 101G and the blue pixel region 101B and is electrically connected to the drain electrode 154 via the contact hole 175.

The pixel electrode 180 may be formed of a transparent conductor such as indium tin oxide (ITO) or indium zinc oxide (IZO).

The first alignment layer 185 may be disposed on the pixel electrode 180. The first alignment layer 185 may include a photoreactive material. The first alignment layer 185 may be formed of one of polyimide, polyamic acid and polysiloxane.

The second panel 200 may include a second substrate 210, a light-shielding pattern 220, an overcoat layer 230, a common electrode 240, and a second alignment layer 250.

The second substrate 210 may be made of transparent glass or plastic.

The light-shielding pattern 220 may be disposed on the second substrate 210 facing the first substrate 105 such that it overlaps with the thin-film transistor TFT, the gate line 112 and the data line 151. The light-shielding pattern 220 blocks unnecessary light when the display device 10 displays an image. Although the light-shielding pattern 220 is shown as being disposed on the second substrate 220, it may be disposed on the first substrate 105 as well.

The overcoat layer 230 may be disposed under the light-shielding pattern 220. The overcoat layer 230 serves to protect and insulate the light-shielding pattern 220, and provides a flat surface. The overcoat layer 230 may be formed using an acrylic-based epoxy material.

The common electrode 240 may be disposed under the overcoat layer 230. The common electrode 240 is electrically connected to a common line (not shown). The common electrode 240 may be formed of a transparent conductor such as indium tin oxide (ITO) or indium zinc oxide (IZO).

The second alignment layer 250 may be disposed under the common electrode 240. The second alignment layer 250 may be formed of the same material as the first alignment layer 185.

Although not shown in the drawings, a polarizing plate may be disposed on the lower surface of the first substrate 105 and the upper surface of the second substrate 210.

The liquid-crystal layer 300 includes liquid-crystal molecules having dielectric anisotropy. The longer axis of the liquid-crystal molecules may be perpendicular or parallel to the surfaces of the two display panels 100 and 200 when no electric field is applied.

The backlight unit 400 may be disposed below the first display panel 100. The backlight unit 400 may provide light to the first display panel 100

Hereinafter, the capping layer 170 which is disposed between the passivation layer 160 and the pixel electrode 180 will be described in detail.

The thickness of the capping layer 170 may be determined to meet the destructive interference condition expressed by Mathematical Expression 1 below, so that the light provided from the backlight unit 400 can cancel the light reflected from the capping layer 170 due to the difference in refractive indices between the passivation layer 160 and the capping layer 170. The difference in refractive indices between the passivation layer 160 and the capping layer 170 may be 0.2 or more.

$$d1=(\lambda/2)\times(1/2n) \quad \text{[Mathematical Expression 1]}$$

where d1 denotes the thickness of the capping layer 170, λ denotes a wavelength within the visible wavelength range, and n denotes the ratio of refractive indices of the passivation layer 160 to the capping layer 170. The visible wavelength range may be from approximately 380 nm to 720 nm.

For example, referring to FIGS. 3 and 4, when the capping layer 170 is formed of silicon nitride (SiNx) having the refractive index of 1.87 and the passivation layer 160 is a blue color filter 160B having the refractive index of 1.58, blue light may be incident on the capping layer 170, and λ may be a wavelength within the blue wavelength range. The blue wavelength range may range from approximately 400 nm to approximately 500 nm.

When blue light having the wavelength of 450 nm is incident on the capping layer 170 by the blue color filter 160B, the thickness d1 of the capping layer 170 may be approximately 133 nm according to Mathematical Expression 1. As such, the thickness dl of the capping layer 170 may be determined using the wavelength λ of the light incident on the capping layer 170 which passes through the blue color filter 160B. This is because the wavelength of the blue light greatly changes the conditions of the material in the semiconductor layer 130, e.g., the bondings among the amorphous silicon molecules, whereas the wavelength of the red light and the wavelength of the green light do not greatly affect the conditions of the material in the semiconductor layer 130.

The capping layer 170 having the thickness determined by Mathematical Expression 1 may adjust the difference between the phase of the light (indicated by ①) that is provided from the backlight unit 400 (see FIG. 2) and passes through the blue color filter 160B to be incident on the interface between the blue color filter 160B and the capping layer 170, and the phase of the light (indicated by ②) that is provided from the backlight unit 400 (see FIG. 2) and passes through the blue color filter 160B and the capping layer 170 to be reflected from the interface between the capping layer 170 and the first alignment layer 185 to be approximately 180°, thereby canceling the incident light ① and the reflected light ②. In this manner, it is possible to prevent the light from incident on the semiconductor layer 130 of the thin-film transistor TFT.

According to Snell's law, the incidence angle at which the light provided from the backlight unit 400 is incident on the passivation layer 160 through the first substrate 105 having a refractive index of approximately 1.3 to 1.7 may be 40° or less.

As described above, the display device 10 according to the exemplary embodiment of the present disclosure includes the capping layer 170 having the thickness satisfying the destructive interference condition, such that the light provided from the backlight unit 400 can cancel the light reflected from the capping layer 170 due to the difference in the refractive indices between the passivation layer 170 and the capping layer 170.

As a result, it is possible to suppress the light reflected from the capping layer 170 from being incident on the semiconductor layer 130 of the thin-film transistor TFT, thereby reducing leakage current of the thin-film transistor TFT.

Accordingly, the reliability of the switching operation of the thin-film transistor TFT can be improved, thereby reducing display defects on the display device 10.

Hereinafter, a display device according to another exemplary embodiment of the present disclosure will be described.

Figure 5:
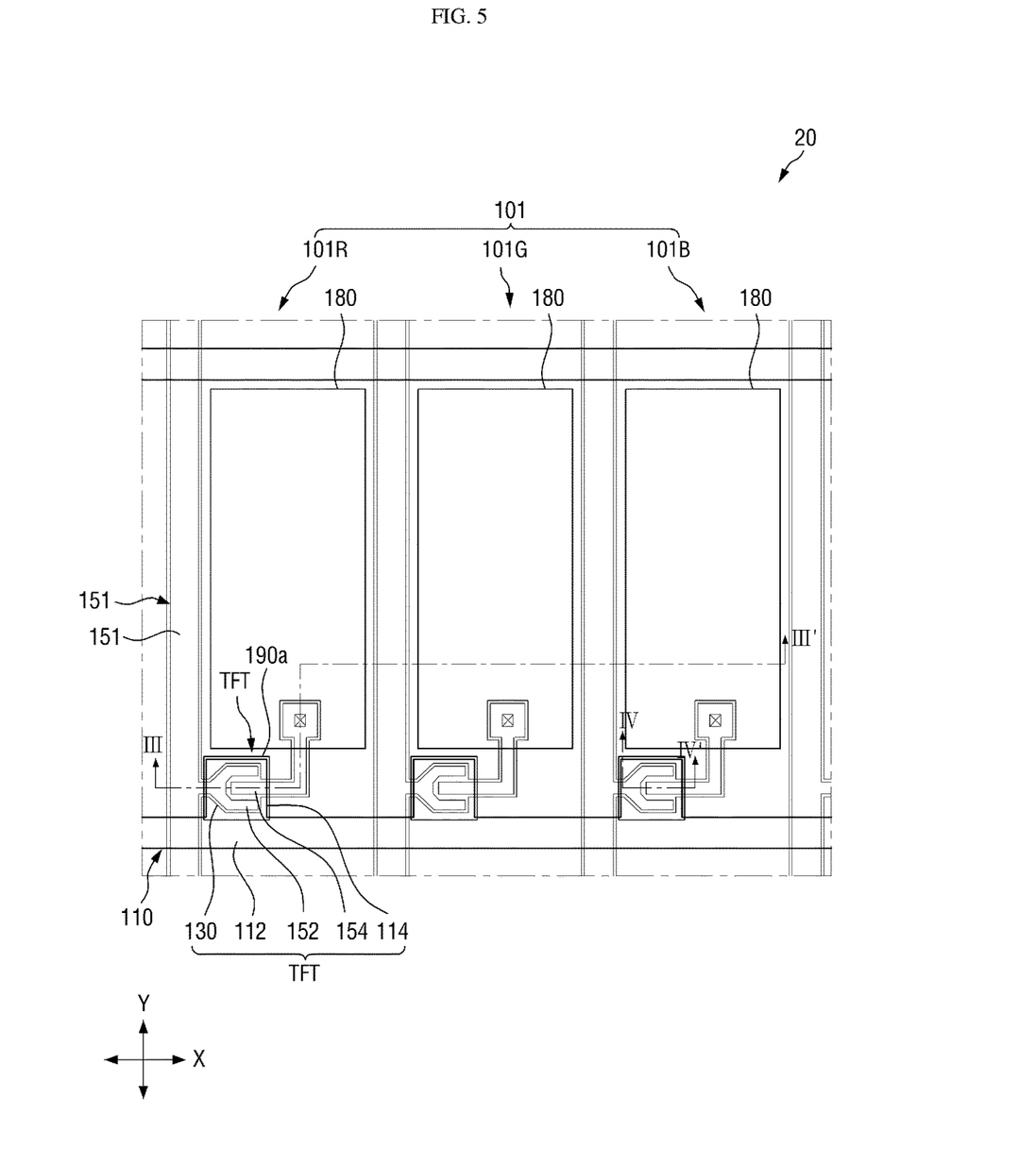
FIG. 5 is a schematic plan view of a display device according to another exemplary embodiment of the present disclosure.
Figure 6:
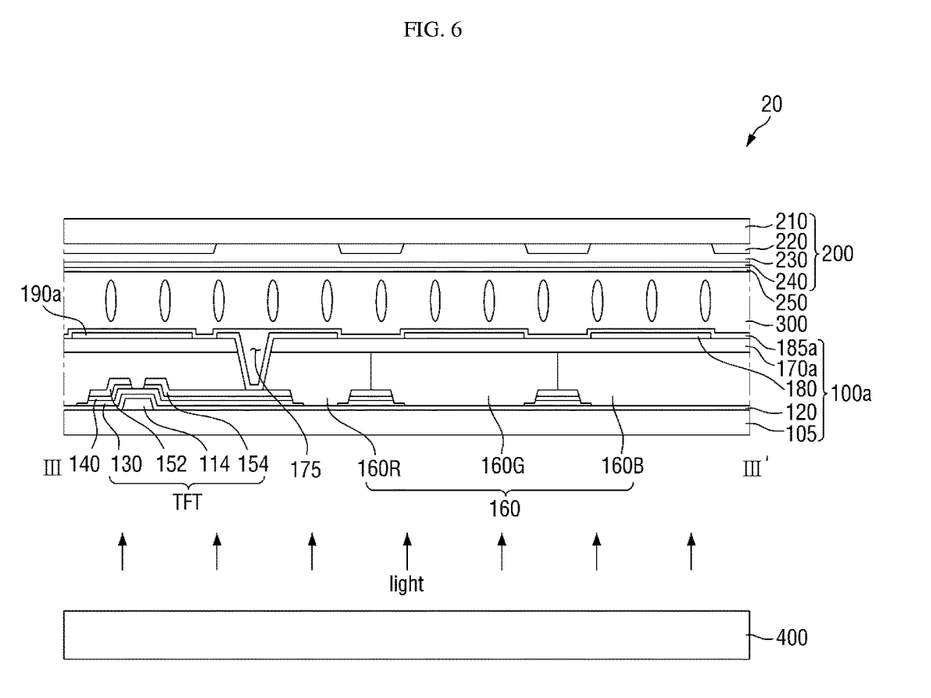
FIG. 6 is a cross-sectional view taken along line III-III' of FIG. 5.
Figure 7:
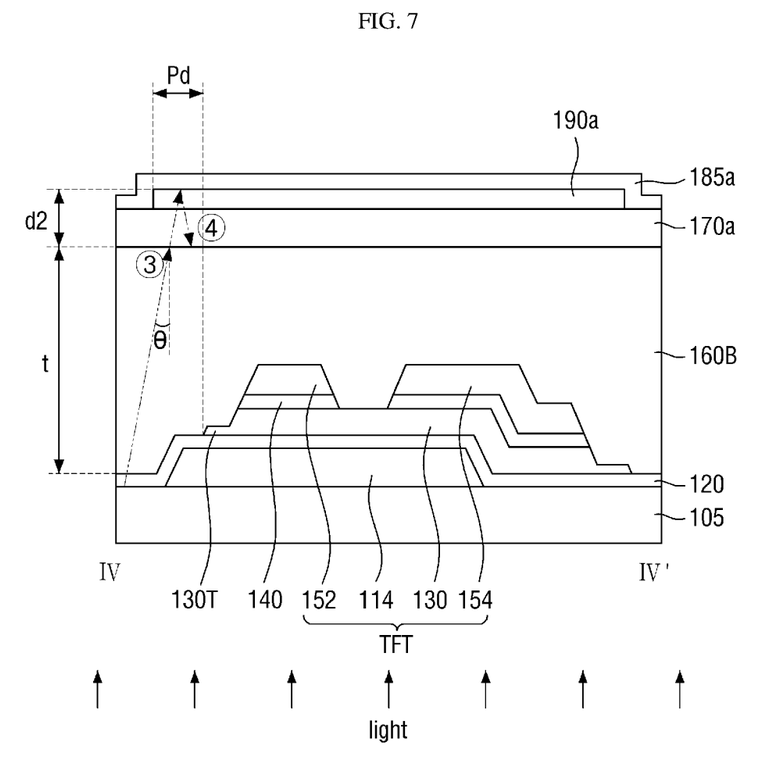
FIG. 7 is an enlarged cross-sectional view taken along line IV-IV' of FIG. 5.
Figure 8:
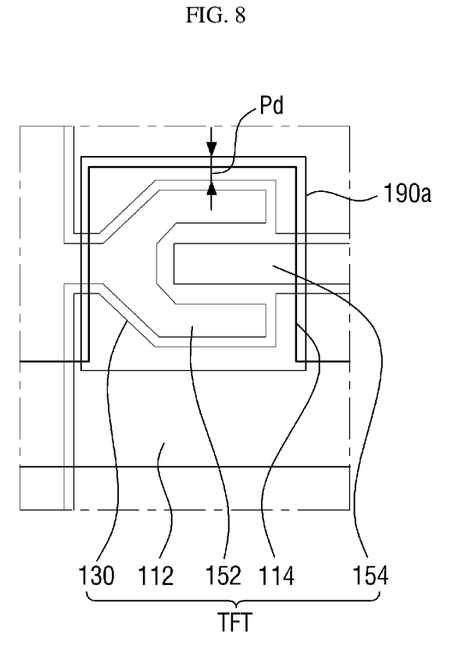
FIG. 8 is a plan view of a part of the thin-film transistor shown in FIG. 5.

FIG. 5 is a schematic plan view of a display device according to another exemplary embodiment of the present disclosure. FIG. 6 is a cross-sectional view taken along line III-III' of FIG. 5. FIG. 7 is an enlarged cross-sectional view taken along line IV-IV' of FIG. 5. FIG. 8 is a plan view of a part of the thin-film transistor shown in FIG. 5.

Referring to FIGS. 5 and 6, the display device 20 according to this exemplary embodiment of the present disclosure is substantially identical to the display device 10 of FIGS. 1 and 2 except that a first display panel 100a includes a first capping layer 170a and a second capping layer 190a so that the light provided from the backlight unit 400 cancels the light reflected from the first capping layer 170a and the second capping layer 190a due to the difference in refractive indices between the passivation layer 160 and the first and second capping layer 170a and 190a.

Accordingly, description will be made focusing on the first capping layer 170a and the second capping layer 190a of the display device 20 according to this exemplary embodiment of the present disclosure.

The first capping layer 170a is identical to the capping layer 170 of FIG. 3 except the thickness.

The second capping layer 190a may be disposed in the same layer as the pixel electrode 180 on the first capping layer 170a. The second capping layer 190a may be formed of a material having a refractive index similar to that of the first capping layer 170a.

For example, the difference between the refractive index of the second capping layer 190a and the refractive index of the first capping layer 170a may range from 0 to 0.2.

When the first capping layer 170 is formed of silicon nitride (SiNx) having the refractive index of 1.87, the second capping layer 190a may be formed of indium tin oxide (ITO) having the refractive index of 1.9. Since indium tin oxide (ITO) may be selected as the material for the pixel electrode 180, the second capping layer 190a may be formed of the same material as the pixel electrode 180 via the same process.

The second capping layer 190a is disposed in order to avoid that the process time for forming the capping layer 170 is increased when the thickness of the capping 170 determined by the destructive interference condition is so large. The second capping layer 190a can be formed without requiring any additional process.

The sum of the thickness of the first capping layer 170a and the thickness of the second capping layer 190a may be determined by Mathematical Expression 2 below so that the second capping layer 190a, along with the first capping layer 170a, can cause the light provided from the backlight unit 400 to cancel the light reflected from the first capping layer 170a and the second capping layer 190a due to the difference in refractive indices between the passivation layer 160 and the first capping layer 170a. The difference in refractive indices between the passivation layer 160 and the first capping layer 170a may be 0.2 or more.

$$d2=(\lambda/2)\times(1/2n) \quad \text{[Mathematical Expression 2]}$$

where d2 denotes the sum of the thickness of the first capping layer 170a and the thickness of the capping layer 190a, λ denotes a wavelength within the visible wavelength range, and n denotes the ratio of refractive indices of the passivation layer 160 to the first capping layer 170a. The visible wavelength range may be from approximately 380 nm to 720 nm.

For example, referring to FIG. 7, when the first capping layer 170a is formed of silicon nitride (SiNx) having the refractive index of 1.87 and the passivation layer 160 is a blue color filter 160B having the refractive index of 1.58, blue light may be incident on the first capping layer 170a, and λ may be a wavelength within the blue wavelength range. The blue wavelength range may be from approximately 400 nm to 500 nm.

When blue light having the wavelength of 450 nm is incident on the first capping layer 170a through the blue color filter 160B, the thickness d2 that is the sum of the thickness of the first capping layer 170a and the thickness of the second capping layer 190a may be approximately 133 nm according to Mathematical Expression 2. For example, the thickness of the first capping layer 170a may be approximately 70 nm, and the thickness of the second capping layer 190a may be approximately 63 nm.

The first capping layer 170a and the second capping layer 190a having the thickness determined by Mathematical Expression 2 may adjust the difference between the phase of the light (indicated by ③ ) that is provided from the backlight unit 400 (see FIG. 6) and passes through the blue color filter 160B to be incident on the interface between the blue color filter 160B and the first capping layer 170a, and the phase of the light (indicated by ④ ) that is provided from the backlight unit 400 and passes through the blue color filter 160B, the first capping layer 170a and the second capping layer 190a to be reflected from the interface between the second capping layer 190a and the first alignment layer 185a to be approximately 180°, thereby canceling the incident light ③ and the reflected light ④ . In this manner, it is possible to prevent the light from incident on the semiconductor layer 130 of the thin-film transistor TFT.

Referring to FIG. 8, the second capping layer 190a may completely cover the gate electrode 114 of the thin-film transistor TFT. For example, the distance between the end of the semiconductor layer 130, that is, the end of the protrusion 130T and the end of the second capping layer 190a may be equal to or greater than the distance obtained by Mathematical Expression 3 below:

$$Pd \geq \tan 40° \times 2t \quad \text{[Mathematical Expression 3]}$$

where Pd denotes the distance between the end of the semiconductor layer 130, that is, the end of the protrusion 130T and the end of the second capping layer 190a, and t denotes the maximum thickness of the passivation layer 160.

Hereinafter, results of analyzing the reflectance according to the incidence angle of light in the configuration of FIG. 7 will be described.

Figure 9:
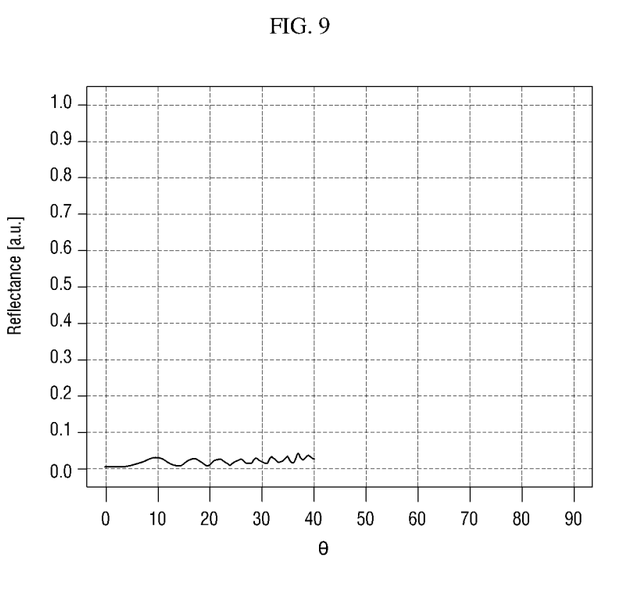
FIG. 9 is a graph showing the reflectivity according to the incidence angle of light in the configuration of FIG. 7.

FIG. 9 is a graph showing the reflectance according to the incidence angle of light in the configuration of FIG. 7.

Referring to FIGS. 7 and 9, when the light provided from the backlight unit 400 (see FIG. 6) passes through the passivation layer 160 via the first substrate 105 at an incidence angle θ of 40° or less, the reflectance of the light reflected from the second capping layer 190a and the first capping layer 170a to travel toward the thin-film transistor TFT is less than 0.05 a.u., which is low.

As described above, the display device 20 according to the exemplary embodiment of the present disclosure includes the first capping layer 170a and the second capping layer 190a having the thickness satisfying the destructive interference condition, such that the light provided from the backlight unit 400 can cancel the light reflected from the first capping layer 170a and the second capping layer 190a due to the difference in the refractive indices between the passivation layer 160 and the first capping layer 170a.

As a result, it is possible to suppress the light reflected from the first capping layer 170a and the second capping layer 190a from being incident on the semiconductor layer 130 of the thin-film transistor TFT, thereby reducing leakage current of the thin-film transistor TFT.

Accordingly, the reliability of the switching operation of the thin-film transistor TFT can be improved, thereby reducing display defects on the display device 20.

In addition, in the display device 20 according to the exemplary embodiment of the present disclosure, by forming the second capping layer 190a in the same layer as the pixel electrode 180 with the same material as the pixel electrode 180 via the same process, it is possible to prevent the process time from increasing when a single capping layer has a large thickness to meet the destructive interference condition.

In concluding the detailed description, those skilled in the art will appreciate that many variations and modifications can be made to the preferred embodiments without substantially departing from the principles of the present inventive concept. Therefore, the disclosed preferred embodiments of the inventive concept are used in a generic and descriptive sense only and not for purposes of limitation.

What is claimed is:

1. A display device comprising:
   a substrate;
   a thin-film transistor disposed on the substrate;

a passivation layer covering the thin-film transistor;
a capping layer disposed on the passivation layer; and
a pixel electrode disposed on the capping layer and connected to the thin-film transistor,
wherein the passivation layer is one of a red color filter, a green color filter and a blue color filter, and
wherein a thickness of the capping layer is determined according to:

$$d1=(\lambda 2) \times (1/2n),$$

where d1 denotes the thickness of the capping layer, λ denotes a wavelength within visible wavelength range, and n denotes a ratio of refractive indices of the passivation layer to the capping layer.

2. The display device of claim 1, wherein the λ is a wavelength within blue wavelength range.

3. The display device of claim 1, wherein a difference between the refractive index of the passivation layer and the refractive index of the capping layer is equal to or greater than 0.2.

4. The display device of claim 1, wherein the capping layer comprises an inorganic material.

5. The display device of claim 4, wherein the passivation layer is the blue color filter, and wherein the capping layer comprises silicon nitride.

6. The display device of claim 1, wherein the thin-film transistor, the passivation layer and the capping layer overlap with one another in a plan view.

7. The display device of claim 1, wherein the thin-film transistor comprises a gate electrode, a semiconductor layer disposed on the gate electrode, a source electrode and a drain electrode disposed on the semiconductor layer, and
wherein the semiconductor layer comprises a protrusion protruding from an end of the source electrode and an end of the drain electrode in a plan view.

8. The display device of claim 1, further comprising:
an alignment layer disposed on the pixel electrode;
a liquid-crystal layer disposed on the alignment layer; and
a backlight unit disposed below the substrate.

9. A display device comprising:
a substrate;
a thin-film transistor disposed on the substrate;
a passivation layer covering the thin-film transistor;
a capping layer disposed on the passivation layer; and
a pixel electrode disposed on the capping layer and connected to the thin-film transistor,
wherein the passivation layer is one of a red color filter, a green color filter and a blue color filter, and
wherein, for a wavelength within a wavelength range of light incident on the capping layer, a thickness of the capping layer is determined according to:

$$d1=(\lambda 2) \times (1/2n),$$

where d1 denotes the thickness of the capping layer, λ denotes a wavelength within the wavelength range of the light incident on the capping layer, and n denotes a ratio of refractive indices of the passivation layer to the capping layer.

10. The display device of claim 9, wherein the λ is a wavelength within blue wavelength range.

11. A display device comprising:
a substrate;
a thin-film transistor disposed on the substrate;
a passivation layer covering the thin-film transistor;
a first capping layer disposed on the passivation layer;
a pixel electrode disposed on the first capping layer and connected to the thin-film transistor; and
a second capping layer disposed on the same layer as the pixel electrode and overlapping with the thin-film transistor,
wherein the passivation layer is one of a red color filter, a green color filter and a blue color filter, and
wherein a sum of a thickness of the first capping layer and the second capping layer is determined according to:

$$d2=(\lambda 2) \times (1/2n),$$

where d2 denotes the sum of the thickness of the first capping layer and the thickness of the second capping layer, λ denotes a wavelength within visible wavelength range, and n denotes a ratio of refractive indices of the passivation layer to the first capping layer.

12. The display device of claim 11, wherein the λ is a wavelength within blue wavelength range.

13. The display device of claim 11, wherein a difference between the refractive index of the passivation layer and the refractive index of the first capping layer is equal to or greater than 0.2, and wherein a difference between the refractive index of the first capping layer and the refractive index of the second capping layer ranges from 0 to 0.2.

14. The display device of claim 11, wherein the first capping layer comprises an inorganic material, and wherein the second capping layer is made of the same material as the pixel electrode.

15. The display device of claim 14, wherein the passivation layer is the blue color filter, wherein the first capping layer comprises silicon nitride, and wherein the second capping layer comprises indium tin oxide.

16. The display device of claim 11, wherein the thin-film transistor, the passivation layer, the first capping layer and the second capping layer overlap with one another in a plan view.

17. The display device of claim 11, wherein the thin-film transistor comprises a gate electrode, a semiconductor layer disposed on the gate electrode, a source electrode and a drain electrode disposed on the semiconductor layer, and
wherein the semiconductor layer comprises a protrusion protruding from an end of the source electrode and an end of the drain electrode when viewed from a top.

18. The display device of claim 17, wherein a distance between an end of the second capping layer and an end of the protrusion is determined according to:

$$Pd \geq \tan 40° \times 2t,$$

where Pd denotes the distance between the end of the second capping layer and the end of the protrusion, and t denotes a maximum thickness of the passivation layer.

19. The display device of claim 17, wherein the second capping layer completely covers the gate electrode.

20. The display device of claim 11, further comprising:
an alignment layer disposed on the pixel electrode;
a liquid-crystal layer disposed on the alignment layer; and
a backlight unit disposed below the substrate.

21. The display device of claim 1, wherein the passivation layer is the blue color filter.

22. The display device of claim 9, wherein the passivation layer is the blue color filter.

23. The display device of claim 11, wherein the passivation layer is the blue color filter.

* * * * *